United States Patent
Cohen et al.

(10) Patent No.: US 6,813,307 B1
(45) Date of Patent: Nov. 2, 2004

(54) MODULE CHANNEL FOR ACQUIRING AND TRACKING IN A RADIO COMMUNICATION SYSTEM

(75) Inventors: Michel Cohen, Paris (FR); Emmanuel Lemois, Paris (FR); Laurent Cuvelier, Gentinnes (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/581,043

(22) PCT Filed: Oct. 25, 1999

(86) PCT No.: PCT/FR99/02583

§ 371 (c)(1),
(2), (4) Date: Jun. 8, 2000

(87) PCT Pub. No.: WO00/25450

PCT Pub. Date: May 4, 2000

(30) Foreign Application Priority Data

Oct. 26, 1998 (FR) .............................. 98 13374

(51) Int. Cl.$^7$ ............................................. H04B 1/707
(52) U.S. Cl. ...................................... 375/145; 375/367
(58) Field of Search ................................. 375/141, 145, 375/146, 149, 356, 365, 367; 370/209, 320, 335, 350, 509, 510, 511

(56) References Cited

U.S. PATENT DOCUMENTS

| | | | |
|---|---|---|---|
| 3,730,998 A | | 5/1973 | Schmidt et al. |
| 4,455,651 A | | 6/1984 | Baran |
| 4,688,210 A | | 8/1987 | Eizenhofer et al. |
| 5,398,258 A | | 3/1995 | Su et al. |
| 6,144,650 A | * | 11/2000 | Watanabe et al. ........... 370/335 |
| 6,574,205 B1 | * | 6/2003 | Sato ........................... 370/335 |
| 6,741,578 B1 | * | 5/2004 | Moon et al. ................. 370/335 |

FOREIGN PATENT DOCUMENTS

| | | |
|---|---|---|
| EP | 0 726 658 A2 | 8/1996 |
| EP | 0 729 241 A2 | 8/1996 |
| EP | 0 795 971 A2 | 9/1997 |
| EP | 0 814 577 A1 | 12/1997 |
| WO | WO 97/36383 | 10/1997 |
| WO | WO 98/49790 | 11/1998 |
| WO | WO 98/58464 | 12/1998 |

OTHER PUBLICATIONS

Kouji Ohuchi et al, "Theoretical Analysis of M–ary/SS Communication Systems Using Racing Counters and a Hadamard Matrix", IEEE Journal on Selected Areas in Communications, vol. 14, No. 8, Oct. 1, 1996, pp. 1569–1575.

* cited by examiner

*Primary Examiner*—Don N. Vo
(74) *Attorney, Agent, or Firm*—Sughrue Mion, PLLC

(57) ABSTRACT

In a radiocommunications system having physical channels each including at least one logical channel, the invention proposes transmitting both the means for acquiring and tracking synchronization and the system information addressed to user stations in a single logical channel referred to as the "synchronization" channel. For this purpose, the synchronization channel carries a repeated detection word (1) together with system information (2) between repeats of the detection word. The system information is subjected to spreading prior to being transmitted over the synchronization channel. The invention makes it possible to limit the amount of system resources that are devoted to providing the functions of synchronization and of broadcasting system information.

9 Claims, 2 Drawing Sheets

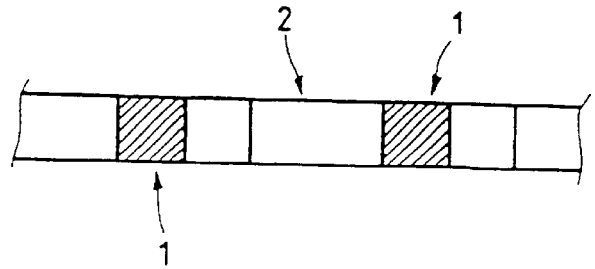
FIG_1
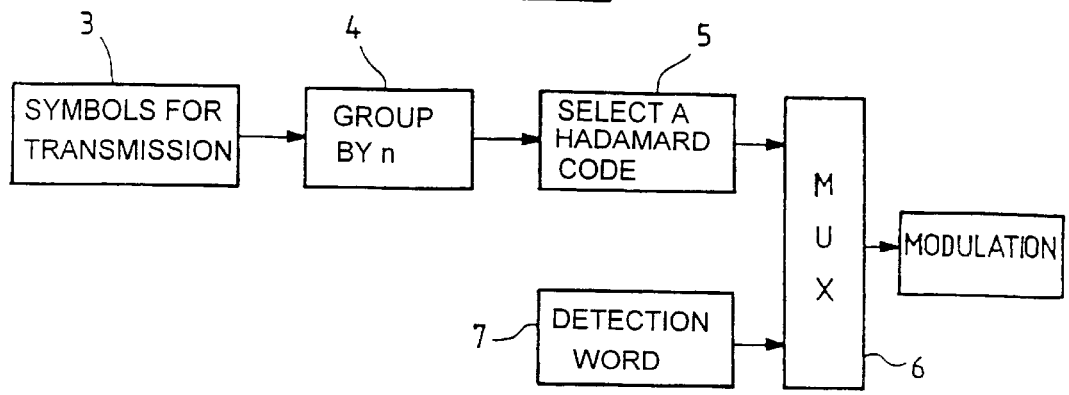
FIG_2
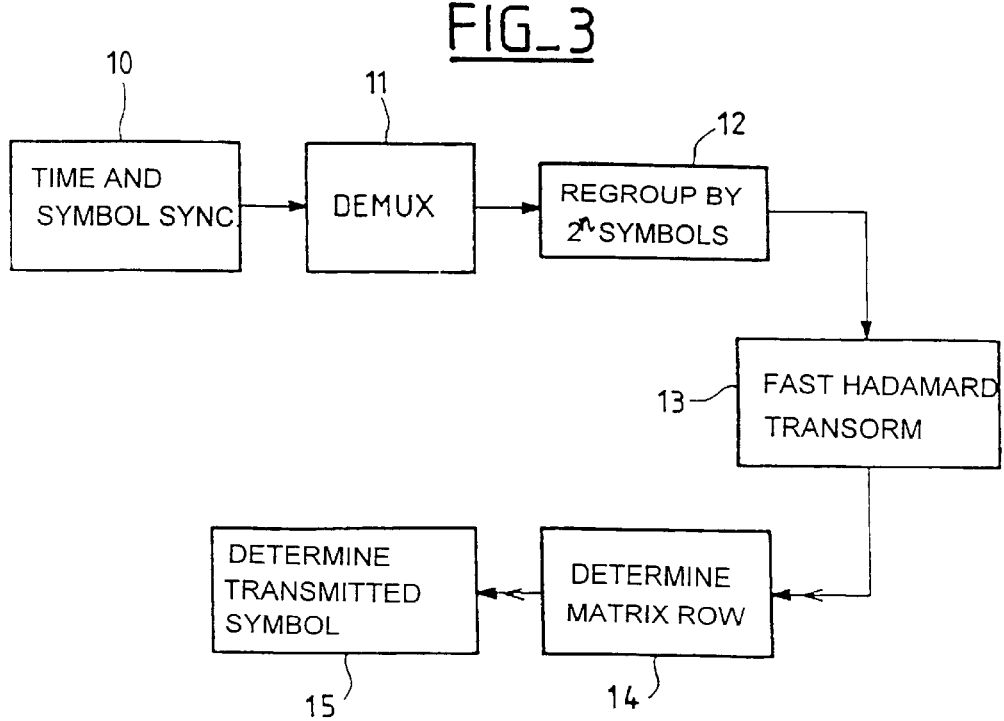
FIG_3

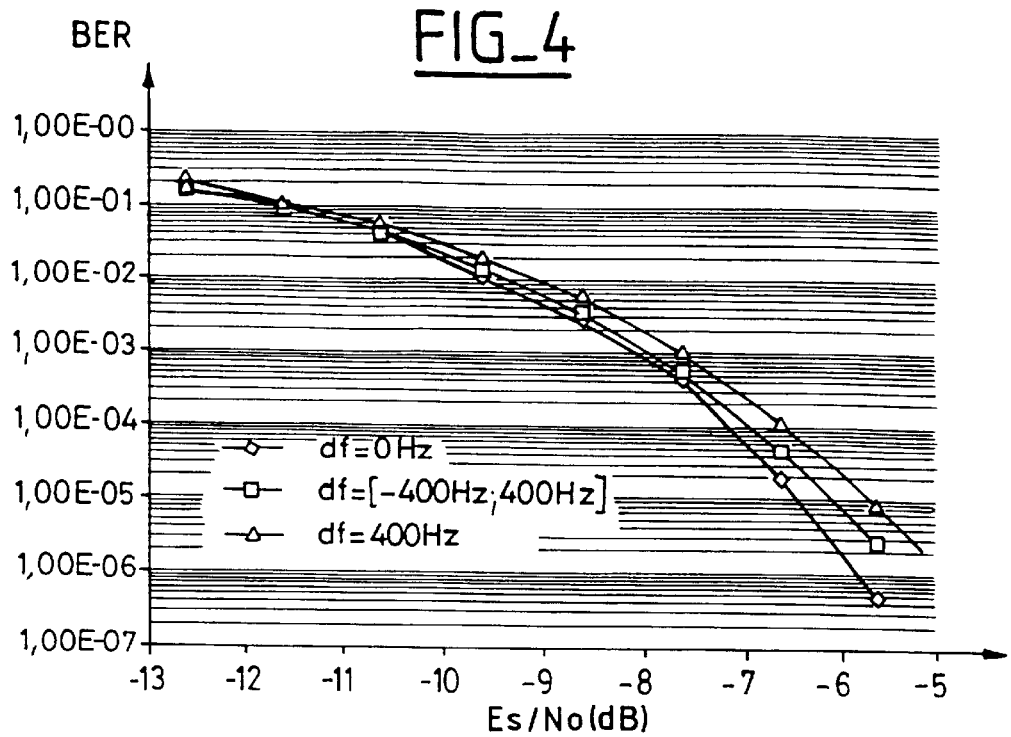
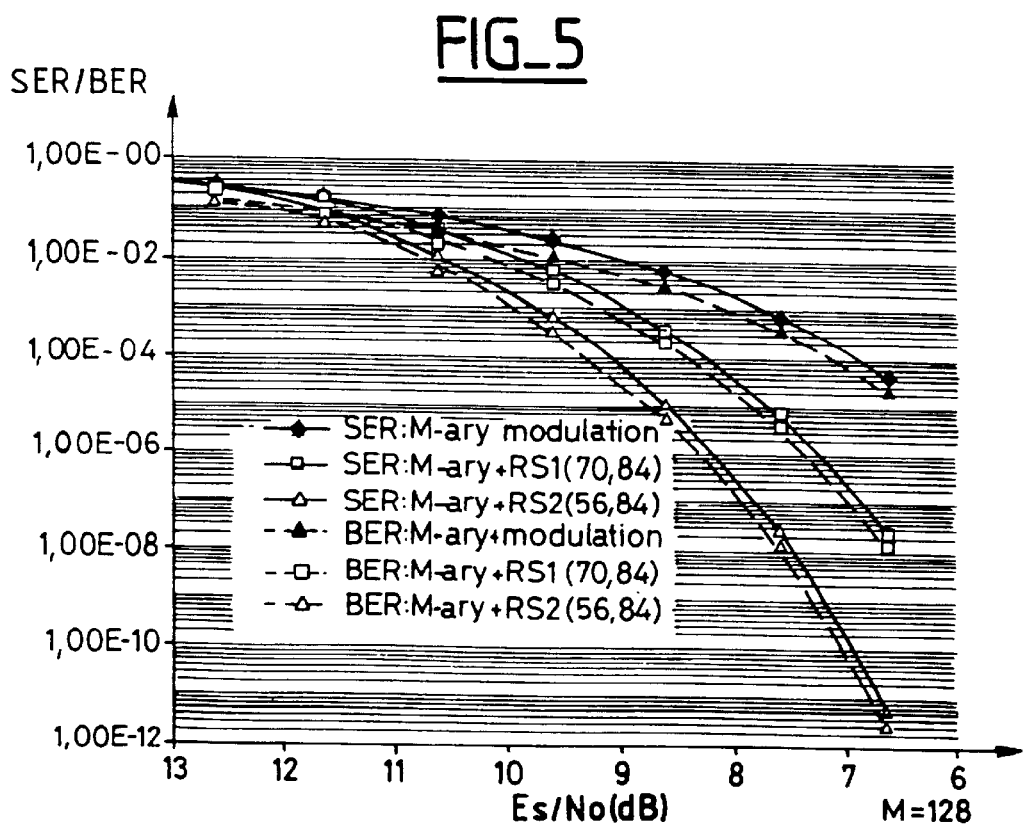

MODULE CHANNEL FOR ACQUIRING AND TRACKING IN A RADIO COMMUNICATION SYSTEM

BACKGROUND OF THE INVENTION

The present invention relates to the field of communications by radio. More particularly, it relates to time and frequency acquisition and tracking in radiocommunications systems. It applies in particular to cellular radiocommunications systems, to cellular radiocommunications systems using satellites, or to other wireless radiocommunications systems.

In such radiocommunications systems, problems arise concerning synchronization of the various terminals or stations which are in communication in the system, so as to make it possible for the transmitted signals to be demodulated correctly. A user station which generally does not have accurate clock generator means, must acquire time and frequency synchronization with a transmitter station in order to be able to demodulate the signals it receives from said transmitter station. It is also essential for a user station to be able to perform tracking in time and in frequency, i.e. to maintain time and frequency synchronization throughout a call so as to enable it to continue correctly demodulating the signals it receives.

This problem arises in particular in systems that make use of spread spectrum modulation in which demodulation is possible only when synchronization is acquired. It also arises in low earth orbit (LEO) satellite systems where satellites provide geographical coverage that varies for a given user station.

Physical channels are defined in such radiocommunications systems enabling information to be transmitted and typically corresponding to a carrier frequency; such physical channels are subdivided into logical channels, e.g. by time division or by code division, so as to provide multiple access on a single physical channel. Time division multiple access (TDMA) and code division multiple access (CDMA) are known per se.

Communicating with user stations in a radiocommunications system also requires system information to be broadcast to the stations by using a logical channel associated with a physical channel. By way of example, the system information can comprise the name or the number of the base station ("gateway"), or the geographical location in cell terms. The term "broadcast" is used below to designate transmitting such system information, and the term "traffic" is used to designate the content of the messages interchanged with users. The data rate for system information is usually quite low compared with the data rate for traffic, and is typically a few kilobits per second.

One of the constraints in such a radiocommunications system lies in reaching all of the user stations in the coverage zone, including those which are least favored from the propagation point of view. This constraint is in addition to constraints associated with limitations on spectrum and power resources specific to each type of system.

To perform these functions of acquiring and tracking synchronization and of broadcasting system information, proposals have been made to use a plurality of physical channels, for example a high power unmodulated pilot channel and another physical channel for broadcasting the information. The unmodulated pilot channel makes it easy for the user station to latch on to the frequency of the channel and to achieve time synchronization. Frequency synchronization is acquired by conventional methods of the fast Fourier transform (FFT) type. That method using an unmodulated pilot is implemented in particular in the Qualcomm CDMA radiocommunications system.

That solution suffers from drawbacks. The use of a high power unmodulated channel makes time synchronization simpler, but consumes a large amount of power. In addition, the use of an unmodulated physical channel occupies a plurality of logical resources, and can therefore diminish the capacity of the system. Finally, that solution implies quite complex sequencing of procedures: firstly it is necessary to acquire time synchronization and frequency synchronization on the unmodulated channel, then it is necessary to go to some other logical channel to receive the system information, and finally it is possible to demodulate the traffic channels.

SUMMARY OF THE INVENTION

The invention proposes a solution to the problem of acquiring and tracking synchronization in a radiocommunications system. It also proposes a solution to the problem of broadcasting information to user stations.

Unlike known solutions, the invention proposes using a single logical channel, preferably without increasing power, both for the purposes of acquiring and tracking synchronization in time and frequency, and also for broadcasting system information.

It thus makes it possible to make savings in power expenditure, and to limit the amount of resources (physical channels) used solely for synchronization; it also makes it possible to simplify the procedures for acquiring and tracking synchronization.

More precisely, the invention provides a synchronization channel for a radiocommunications system between a plurality of stations, the system having a detection word that is repeated on the channel, and system information that occurs between repetitions of the detection word.

Advantageously, the repetitions of the detection word form a periodic pattern in the channel, the period of the pattern being a submultiple or a multiple of a frame period of the channel.

The detection word can also be repeated periodically, at a period that is a submultiple or a multiple of a frame period of the channel.

In a preferred embodiment of the invention, the system information is transmitted on the channel after being spread.

Advantageously, the spreading is spreading by M-ary modulation using a Hadamard code.

Preferably, prior to being spread, the system information is encoded by an error correcting code.

The invention also provides a radiocommunications system having such a synchronization channel.

Advantageously, the system has a plurality of physical channels, each physical channel having at least one logical channel; the synchronization channel is a logical channel.

Preferably, the logical channels are defined by code division multiple access.

BRIEF DESCRIPTION OF THE DRAWINGS

Other characteristics and advantages of the invention will appear on reading the following description of embodiments thereof, given by way of example and with reference to the accompanying drawings, in which:

FIG. 1 is a diagram showing the appearance of a synchronization channel of the invention;

FIG. 2 is a diagram of a transmitter for such a channel;

FIG. 3 is a diagram of a receiver for such a channel;

FIG. 4 is a graph showing bit error rate as a function of signal-to-noise ratio for different frequency differences; and FIG. 5 is a graph of bit error rate as a function of signal-to-noise ratio for different types of error correcting code.

DETAILED DESCRIPTION OF THE INVENTION

In the description below, the invention is described with reference to a radiocommunications system with satellites in low earth orbit (LEO) and using spectrum spreading together with code division multiple access (CDMA). Naturally, the invention is not restricted to that kind of system only.

In such a system, on a common carrier constituting a physical channel, there are multiplexed a plurality of signals that have been spread by being multiplied by orthogonal codes. The orthogonality of the codes ensures that each user station can recover the signals addressed thereto by multiplication using its own code.

Each code defines a logical channel which can be used for traffic or for broadcasting system information; it is possible to define a frame which may itself be subdivided into elementary time slots; the size of the code or of the time slots, and the corresponding data rates depend on the characteristics of each system and can vary.

The invention proposes using a single logical channel, preferably without increasing power, and to do so for all of the functions associated with acquiring and tracking synchronization and with broadcasting system information. In the description below, the corresponding channel is referred to as the "synchronization" channel. In the above-mentioned example of logical channels defined by orthogonal codes, it is advantageous to use one of the codes for defining the synchronization channel, however with other types of modulation, the synchronization channel corresponds to a logical channel, i.e. all or part of a carrier or of a physical channel.

FIG. 1 shows the appearance of the synchronization channel. As can be seen in the figure, a synchronization word 1 is repeated on the synchronization channel at a given periodicity. Between repeats or occurrences of the detection word, the synchronization channel carries system information 2 for broadcasting to the user stations.

The size, the structure, and the power of the detection word depend on the characteristics of the system in question, and they are selected so as to enable user stations to acquire synchronization, and where appropriate to track synchronization. In conventional manner, the detection word, also referred to in practice as the "unique" word, presents a high degree of self-correlation and a low probability of appearing in a transmitted message. These properties make it easier to detect the detection word on the channel.

Repetition of the detection word in the synchronization channel enables a user station to acquire time synchronization by recognizing the detected word in the logical channel. In addition, recognition of the detected word enables the user station to acquire symbol synchronization.

An appropriate choice for the position of the detection word(s) in a frame also makes it possible for a user station to acquire frame synchronization. The detection word is thus preferably repeated at a period that corresponds to the frame period. Within a frame, repetition of the detected word can be periodic or otherwise. In other words, to enable frame synchronization to be acquired, repeats of the detection word advantageously form a periodic pattern in the channel, where the period of the pattern is a submultiple or a multiple of the frame period of the channel. The detection word can also be repeated once only per frame.

In the simplest case, the detection word is repeated periodically at a period which is a submultiple or a multiple of the frame period. A user station can thus acquire symbol and frame synchronization merely by recognizing the detection word.

By way of example, we consider the case of logical channels defined by orthogonal codes having a length of 128 symbols, with a frame made up of 24 time slots each having a unit length of 424 symbols. Under such circumstances, it is possible to use a detection word having a length of 80 symbols which is repeated once every other time slot.

After time synchronization and symbol and frame synchronization have been acquired, a first frequency estimate can be made by conventional techniques, e.g. by the developed phase method.

Between occurrences of the detection word, the invention proposes broadcasting system information. It is thus possible on a single logical channel to transmit all of the elements required for user station synchronization. The invention thus makes it possible to avoid using up system resources, and it reduces the impact of the acquisition and synchronization functions on the transmission capacity of the system. The solution of the invention also makes it possible to vary the effective data rate with which system information is broadcast without any spectrum modifications.

Advantageously, system information is transmitted over the logical channel after spreading, and each symbol of the logic channel conveys not an entire symbol of system information, but a portion of a symbol, known as a "chip", that results from the symbols of the system information being spread. The broadcast data rate, in terms of number of system information symbols broadcast per second, or the real information data rate, is then lower; nevertheless, system information spreading remains possible while using only one logical channel, in particular because of the low data rate required for system information.

The fact that the real data rate of system information is lower than the nominal data rate of the carrier and also because of the modulation used it is possible to counter greater amounts of attenuation, and to withstand frequency differences better.

This embodiment makes it possible to increase the signal-to-noise ratio of system information symbols for a given level of signal-to-noise in the logical channel. This ensures that even those user stations which are the least favored from the propagation point of view receive system information correctly; as a result the invention provides a high degree of robustness. System information symbol spreading can be performed by conventional spreading techniques, e.g. as described by M. K. Simon et al., in "Spread spectrum communications" published by Computer-Science Press, 1988. The description below with reference to FIG. 2 shows an implementation for Hadamard codes as a specific example of M-ary modulation. The use of Hadamard codes for spreading system information prior to being broadcast on the synchronization channel between the detection words is particularly advantageous because demodulation is non-coherent; this increases its ability to withstand variations of phase and frequency.

Provision can be made to use error correcting codes for the system information as transmitted between occurrences of the detection word. Such codes are simple to implement.

FIG. 2 is a diagram of a transmitter for a synchronization channel of the invention. The example shown in the figure uses Hadamard M-ary modulation for spreading system information symbols, and quaternary phase shift keying (QPSK) for modulating the carrier.

The system information symbols to be transmitted, referenced 3 in the figure, are initially grouped together in groups of n, as shown at 4. At 5, each group of n symbols is then associated with a line of the Hadamard matrix, i.e. $2^n$ symbols or Hadamard symbols, at the data rate of the carrier. The corresponding M-ary modulation constitutes spreading of the system information symbols to be transmitted.

The Hadamard symbols obtained after spreading are transmitted to a multiplexer 6. The multiplexer also receives the detection word symbols, see reference 7 in the figure. The multiplexer 6 multiplexes the Hadamard symbols and the detection word symbols to obtain a symbol structure of the kind shown in FIG. 1.

The system information symbols at the nominal data rate of the carrier, and multiplexed with the detection word symbols, are then modulated on the logical channel. As a function of the nature of the logical channel, and of the nature of the physical channel, the specific processing can vary. When using code division multiple access, the symbols modulated on the carrier are sampled, and then multiplied by the sequence or code corresponding to the channel, prior to being applied to the physical channel.

For a carrier data rate D, system information is transmitted on the logical channel at a data rate $D.n/2^n$. That is the instantaneous data rate, and no account is taken of the space occupied in the carrier by the detection word.

It will be observed that the power of the detection words in the channel can be different from the power of the transmitted system information. This applies in particular for the case when the system information is transmitted after a first stage of spreading, as in the embodiment described; under such circumstances, the first stage of spreading serves to increase the signal-to-noise ratio of the system information. That means it can be transmitted at a lower level while still being received by user stations under the least favorable reception conditions.

FIG. 3 is a diagram of a receiver for a synchronization channel of the invention, capable of operating with the transmitter of FIG. 2. The symbols received over theological channel, where appropriate after synchronization has been acquired on the chips when using CDMA logical channels, are applied to a block 10 for acquiring time synchronization and symbol synchronization; in the block 10, the receiver looks for the detection word and also, where appropriate, proceeds with frame synchronization. It is possible at this instant to proceed with a first estimate of frequency, as explained above.

The symbols are then demultiplexed at 11 so as to separate transmitted system information from detection words. The system information received between the detection words at the nominal data rate of the channel is then grouped together in groups of $2^n$ symbols, in block 12.

Thereafter, a fast Hadamard transform is applied to the groups of $2^n$ symbols at 13. The line of the transmitted Hadamard matrix is then determined at 14 so as to enable the n transmitted information symbols to be obtained; with this being performed typically by using the criterion of maximum likelihood concerning the line of the Hadamard matrix.

Given the transmitted Hadamard line and the $2^n$ Hadamard symbols on the carrier, it is possible, a posteriori, to estimate the frequency difference and the phase difference.

The information symbols are determined at 15.

In addition to broadcasting system information to the user stations, the invention makes it possible to estimate frequency difference and phase difference. This estimation makes it possible firstly to track the physical channel so that the user station continues to be latched on the transmission frequency of the physical channel. Secondly, this estimation makes it possible to correct the frequency and the phase of signals received on other logical channels on the same physical channel; as a result the invention makes it possible, on a single channel, to group together the functions of estimated both frequency difference and phase difference on a physical channel.

Tracking the detection words also makes it possible to maintain time and symbol synchronization in the user station.

FIG. 4 is a graph showing bit error rate (BER) as a function of signal-to-noise ratio for different frequency differences; the signal-to-noise ratio $E_s/N_0$ is plotted in dB along the abscissa and the bit error rate of the system information is plotted up the ordinate. The figure corresponds to the case when system information is spread by M-ary modulation using Hadamard codes, with $2^n=128$. The curve plotted with lozenges shows simulated results without any frequency difference; the curve plotted with squares shows simulated results for a frequency difference lying in the range −400 Hz to +400 Hz, with equiprobable distribution between those two values. The curve plotted with triangles shows simulated results for a frequency difference of 400 Hz. The figure shows that a frequency error lying in the range −400 Hz to +400 Hz degrades the error rate on bits to a small extent only. For $E_s/N_0$ of −6.8 dB, only 0.5 dB is lost.

The figure does not show the result of using an error correcting code. Typically, such a code can be used for the information symbols prior to being spread by the Hadamard code, in which case correction is performed in the diagram of FIG. 3 after block 14.

Under such circumstances, phase and frequency difference are advantageously determined not from the Hadamard lines, but from the system information symbols as corrected by applying the error correcting code. The corrected system information symbols serve to recover the transmitted Hadamard line, and the transmitted line (or plurality of lines) is compared with the symbols actually received on the carrier.

FIG. 5 is a graph of the bit error rate on the system information or of the symbol error rate (SER) as obtained after spreading, as a function of the signal-to-noise ratio for different types of error correcting code. The notation is the same as in FIG. 4. The figure also corresponds to the case of system information being spread by M-ary modulation using Hadamard codes with $2^n=128$. The curve plotted with black lozenges shows the symbol error rate, and the curve plotted with black triangles shows the bit error rate, without an error correcting code. The two curves plotted using squares show the symbol error rate and the bit error rate when using a Reed Solomon (70, 84) type error correcting code. The two curves plotted using triangles show the symbol error rate and the bit error rate when using a Reed Solomon (56, 84) type error correcting code. The figure shows that using error correcting codes considerably improves the performance of the transmission system.

In terms of error probability, the probability of a frequency error greater than 21 Hz is about $10^{-6}$ for system information bit modulation using 128 symbols. With a Reed Solomon (8, 12) type error correcting code, a shortened code which corrects two errors, probability of about $10^{-8}$ is obtained.

Naturally, the present invention is not limited to the embodiments described and shown, but can be varied in numerous ways by the person skilled in the art.

Thus, in the embodiment of the invention described above, system information symbol spreading is obtained by using Hadamard codes; this is not essential for implementing the invention, and it would also be possible to use other types of spreading code.

The invention has also been described in the context of logical channels that are defined by orthogonal CDMA type codes; it applies equally well to other types of multiple access, using time division multiple access (TDMA) or frequency division multiple access (FDMA), or indeed logical channels defined in other ways.

In the embodiment described, the entire synchronization channel is used for acquiring and tracking synchronization, and for broadcasting information; these functions could be achieved using only a portion of the synchronization channel. Under such circumstances, the remainder of the synchronization channel could be used for traffic.

What is claimed is:

1. A telecommunications system comprising a transmitter station and at least one user station which communicate via radio signals, the system comprising broadcast means for broadcasting system information periodically over at least one logical channel associated with a physical channel, and for broadcasting detection words between said periodic broadcasts of system information and on the same logical channel so as to enable a user station to acquire a physical channel with which said logical channel is associated, the system being characterized in that said system information is spread by M-ary modulation using a Hadamard code prior to being broadcast so as to enable the user stations to perform better phase and frequency tracking of the physical channel with which said logical channel is associated.

2. A telecommunications system according to claim 1, characterized in that said detection words form a periodic pattern in the logical channel, the period of said pattern being a multiple of a frame period of the channel.

3. A telecommunications system according to claim 1, characterized in that said detection words are repeated periodically, the repetition period being a submultiple of a frame period of the channel.

4. A telecommunications system according to claim 1, characterized in that said detection words are repeated periodically, the repetition period being a multiple of a frame period of the channel.

5. A telecommunications system according to claim 1, characterized in that said system information is encoded by an error correcting code prior to spreading.

6. A telecommunications system according to claim 1, characterized in that it comprises a plurality of physical channels, each physical channel comprising at least one logical channel, and in that at least one of the logical channels is used as a synchronizing channel.

7. A telecommunications system according to claim 6, characterized in that said logical channels are defined by code division multiple access.

8. A user station for a telecommunications system according to claim 1, the station comprising at least one receiver portion comprising means for acquiring and tracking the phase and the frequency of a physical channel that includes at least one logical channel, the station being characterized in that it further comprises M-ary demodulation using a Hadamard code mean and in that it performs M-ary demodulation in order to obtain said broadcast system information and to assist in tracking the phase and the frequency of the physical channel.

9. A transmitter station for a telecommunications system according to claim 1, the transmitter comprising means for periodically transmitting detection words on a logical channel, means for transmitting "system" information on said at least one logical channel, the transmitter being characterized in that it further comprises M-ary modulation means, using a Hadamard code, of said system informations.

* * * * *